X. CHARMES.
MOTOR DRIVEN AGRICULTURAL IMPLEMENT.
APPLICATION FILED APR. 19, 1918.
1,361,015.
Patented Dec. 7, 1920.
4 SHEETS—SHEET 1.
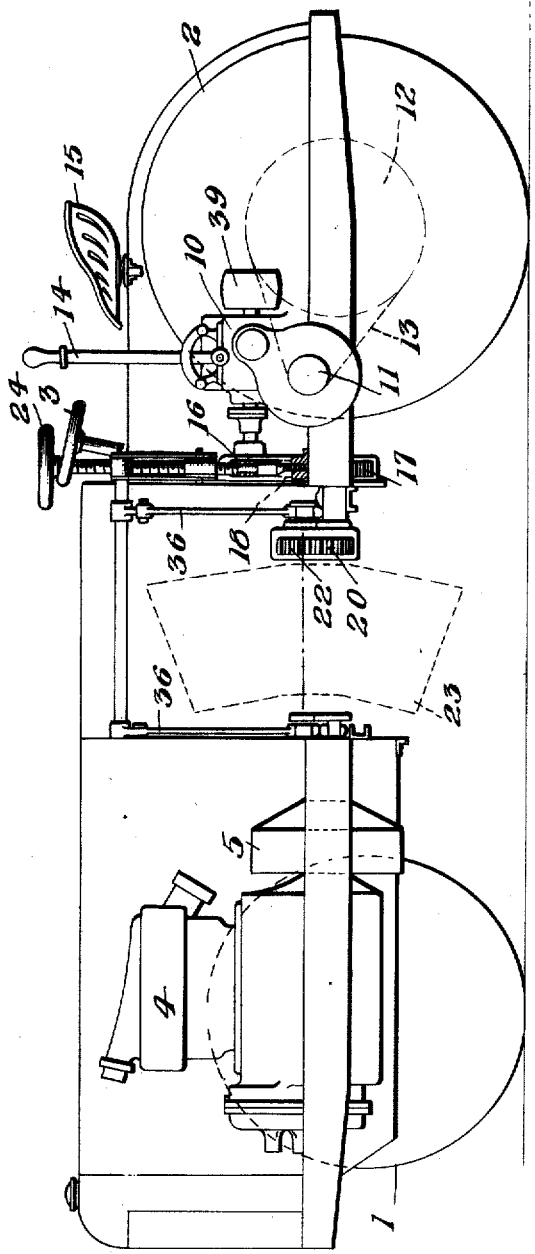
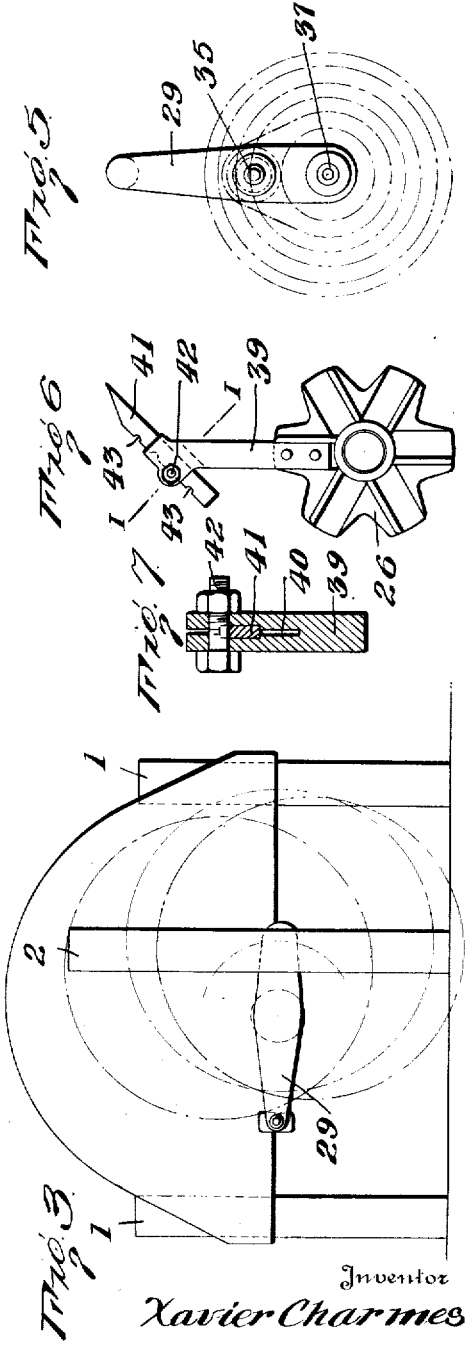
Inventor
Xavier Charmes
By
Lawrence Langner
Attorney

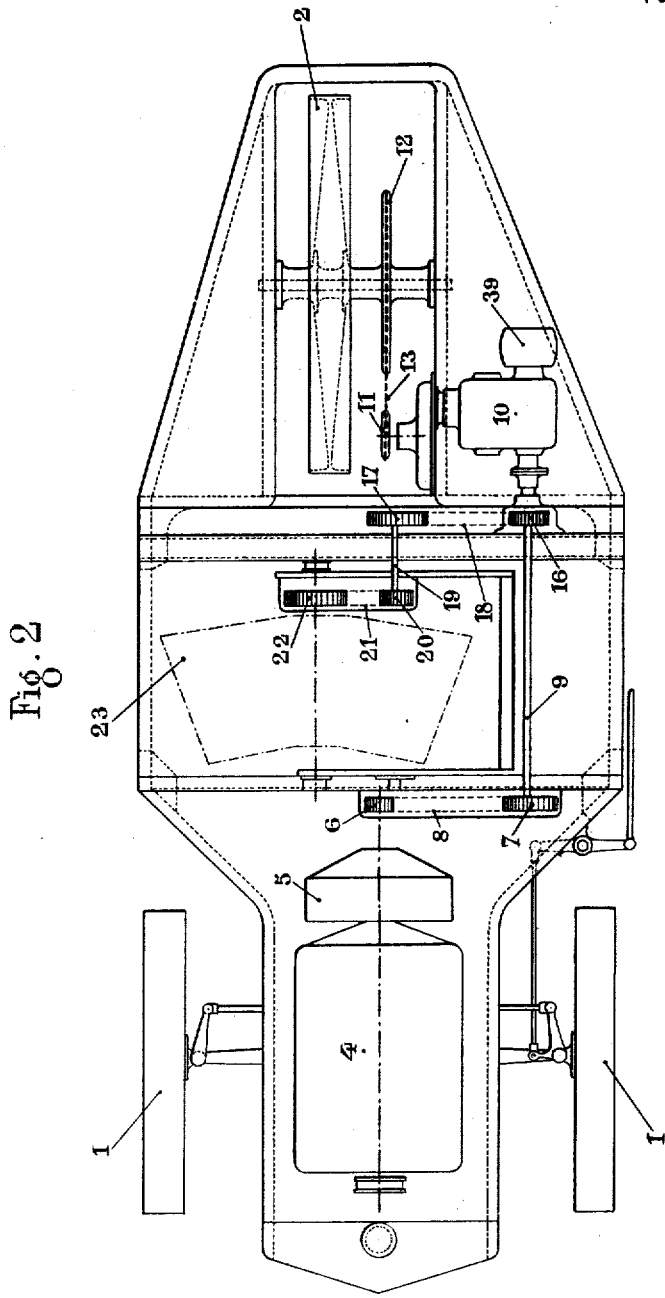

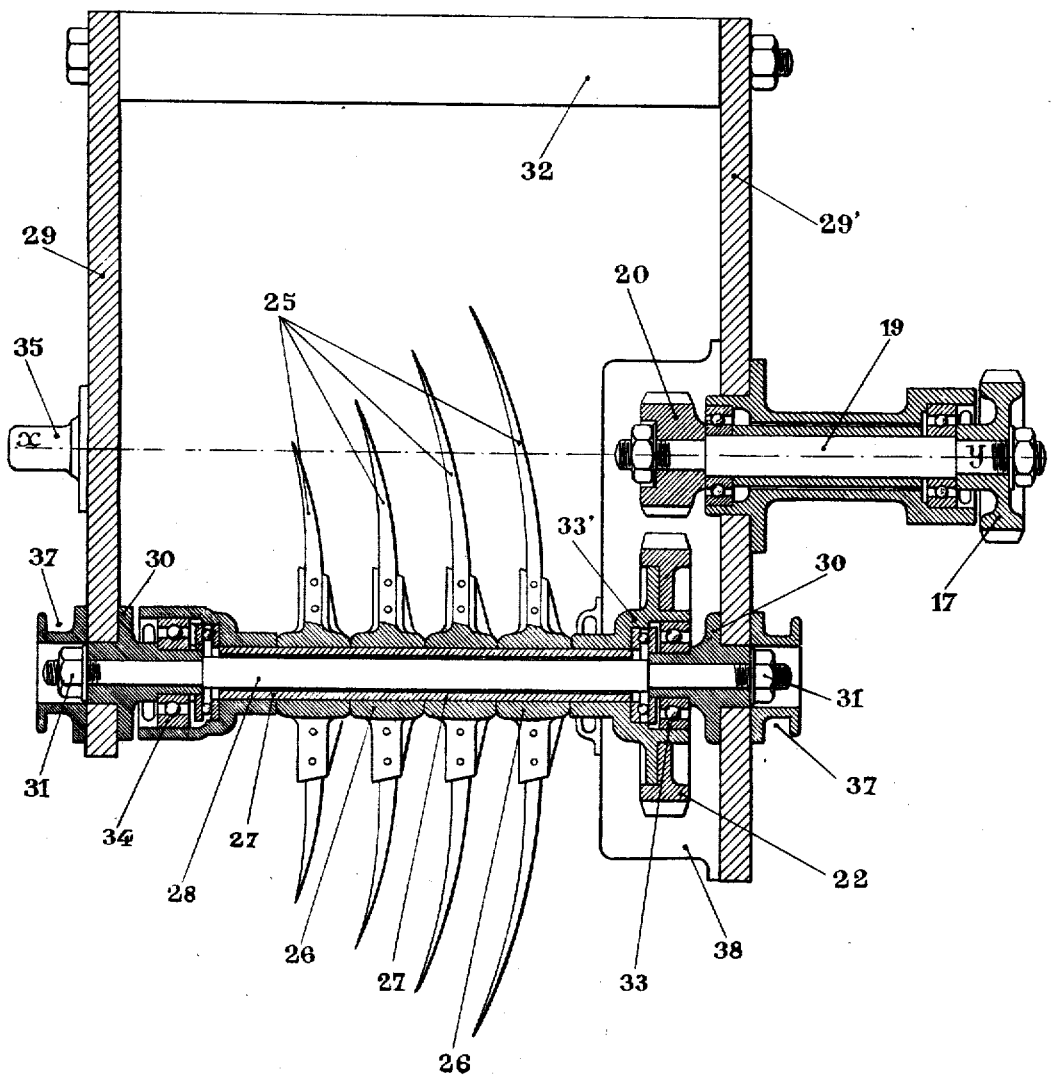

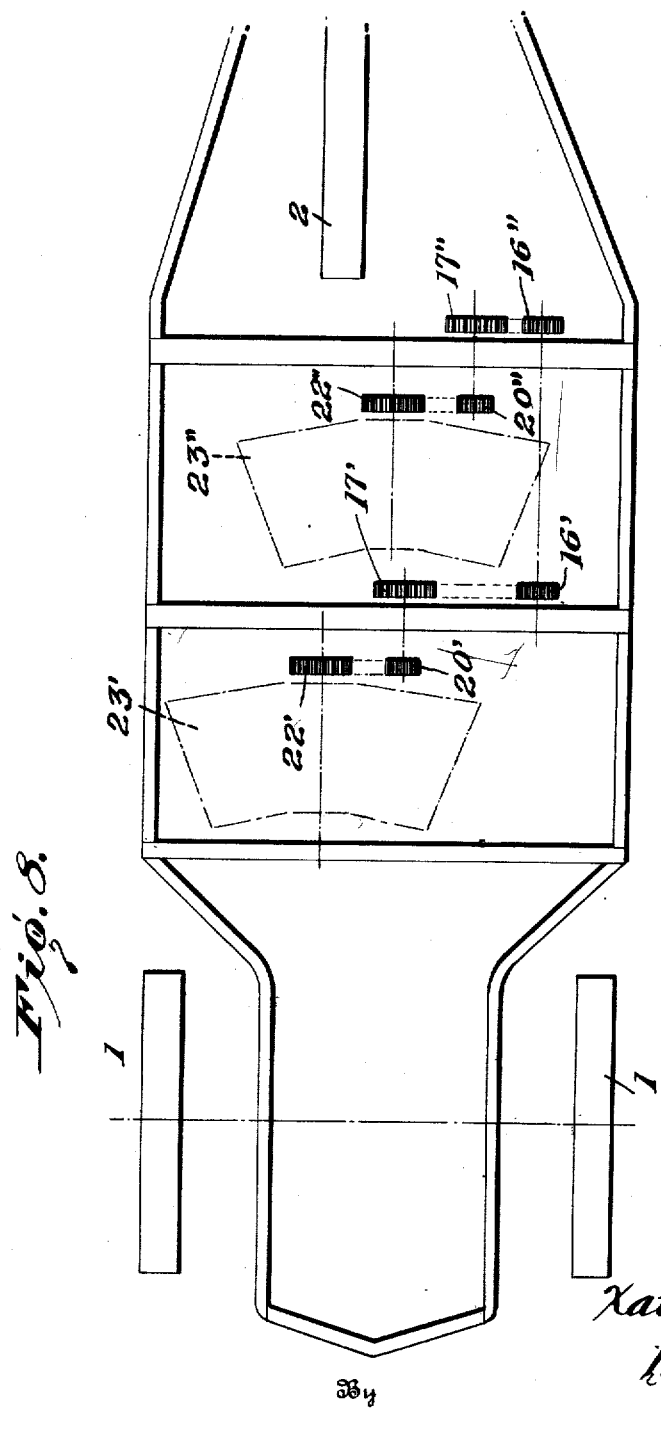

UNITED STATES PATENT OFFICE.

XAVIER CHARMES, OF PARIS, FRANCE.

MOTOR-DRIVEN AGRICULTURAL IMPLEMENT.

1,361,015.  Specification of Letters Patent.  Patented Dec. 7, 1920.

Application filed April 19, 1918. Serial No. 229,512.

*To all whom it may concern:*

Be it known that I, XAVIER CHARMES, a citizen of the French Republic, residing at Paris, France, 17 Rue Bonaparte, have invented new and useful Improvements Relating to Motor-Driven Agricultural Implements, which improvements are fully set forth in the following specification.

The present invention has for its object to provide a motor-driven agricultural implement for breaking up and pulverizing the soil, by means of revolving blades conveniently arranged for this purpose.

The invention comprises various improvements in implements of this class, designed to improve their operation from various points of view. The various mechanical arrangements hereinafter described constitute in themselves and in their combinations the characteristic features of the invention, the objects of which are: to prevent undesirable vibration of the tools during working, and thus to avoid undue wear upon the mechanism and to increase the amount of work done; to balance more completely and easily the system made up of the set of blades; to render the management and control of the implement as easy as possible; and finally to provide a strong structure, simple in its arrangement, which will be sure in operation and easy to manipulate, so that it can be intrusted to laborers having but little skill with mechanical implements. These objects are attained by the implement hereinafter set forth.

The accompanying drawings show, by way of example, one form of construction of the implement and the details of its principal parts, as well as some modifications thereof.

In the drawings:—

Figure 1 is a diagrammatic side elevation of the implement, the covers being assumed to be removed to show the mechanism clearly.

Fig. 2 is a plan view of the implement.

Fig. 3 is a diagrammatic rear elevation thereof.

Fig. 4 is a section, drawn to a larger scale, showing the construction of the blades, and the driving and lifting gear for these latter.

Fig. 5 is a diagrammatic face view of the parts shown in Fig. 4.

Fig. 6 shows, in elevation, a form of toolholder in which the blades are interchangeable, this forming one characteristic feature of the present invention.

Fig. 7 shows to a larger scale, a section on the line I—I of Fig. 6.

Fig. 8, finally, shows a diagrammatic plan view of a modified form of the implement having two sets of working blades.

As shown in Figs. 1 to 3, the implement runs on three wheels; two of these wheels 1, at the front, serve as steering wheels, while the rear wheel 2, which is displaced a little toward one side of the longitudinal center line of the chassis or frame, is the propelling wheel. The steering wheels 1 are manipulated by means of any usual or suitable steering gear from the hand wheel 3, Fig. 1.

The power supplied by the engine 4, which is arranged at the front part of the chassis, is transmitted either to the rear wheel alone, when the vehicle is to travel on roads for example, or to be used as a tractor for certain classes of work, or to the rear wheel and also to the working tools when the implement is used for cultivating the soil, which is its principal function.

The power is transmitted from the engine 4 to the driving wheel 2 through a clutch 5 of any suitable type, wheels 6 and 7 operatively connected by a chain 8, shaft 9 and gear box 10, from which finally the transmission of the drive to the rear wheel is effected through chain wheels 11 and 12, and chain 13.

The change gear box 10 may be of any suitable type; in most cases it is sufficient if it gives two speeds forward and one reverse drive. The movements of the gears necessary for giving the different driving speeds are effected by means of the lever 14 placed in a convenient position to be reached by the hand of the operator when occupying the seat 15.

During the operation of the implement for breaking up the soil, a part of the motive power supplied by the engine 4 is required for the operation of the tools. The drive for these is obtained by means of chain wheels 16 and 17 connected by chain 18. The shaft 19 of wheel 17 carries a wheel 20, and a chain 21 transmits the drive from this through wheel 22 on the shaft of the blades.

In Figs. 1 and 2 the dotted area 23 represents diagrammatically the space occupied by the blades. In these figures the blades are supposed to be in the raised position, that is to say the position which they occupy when the machine is traveling. The operator controls the raising and lowering of the blades by turning the hand wheel 24 (Fig. 1).

A pulley 39 actuated by the shaft 9 through the change speed gear 10, is arranged at the rear of the mechanism and it serves, in case of need, to actuate any other agricultural instrument.

The arrangement and the mounting of the blades, and their method of operation as well as that of their raising and lowering mechanism, are shown in detail, to an enlarged scale, in Figs. 4 and 5. The tools or blades 25 are fixed, at the required angle, on the cross pieces 26 mounted on a hollow shaft 27. A rod 28 passing through the hollow shaft serves as a stay and distance piece between the arms of the lifting mechanism 29, 29'; in order to serve this purpose the rod 28 carries collars 30 with flat faces which bear against the arms 29, 29', and against shoulders on the rod. Nuts 31 screwed on the reduced and threaded ends of the rod 28 hold the parts tightly together. The other ends of the arms 29, 29', are connected by a bar 32 which is made also as a counterweight.

The hollow shaft 27 runs on ball bearings 33 and 34 arranged as shown in Fig. 4. The inner rings of these bearings are mounted on the collars 30 carried by the rod 28; the outer bearing rings are mounted by means of cages or otherwise in the enlarged ends of the hollow shaft 27 in the manner shown, or in any other convenient manner. The chain wheel 22 already refered to, is mounted on the cage 33' of the bearing 33.

The tool-carying shaft 27 is driven, as described above, from chain wheel 20 to chain wheel 22 by means of a chain 21 omitted in Fig. 4, the wheel 20 being itself mounted on shaft 19 which is driven from the engine 4 in the manner already explained. A gear case 38, indicated diagrammatically in Fig. 4, incloses the wheels 20, 22, and chain 21.

The raising out of action of the tools 25 is effected by means of a pivoting movement around the axis $x, y$, which coincides with the axis of the shaft 19; this arrangement constitutes one of the important features of the present invention. In order to carry the parts about the axis of turing $x, y$, a stub 35 is fixed upon the supporting arm 29 in line with the axis of shaft 19. The links 36, Fig. 1, which effect the lifting, and are controlled by the hand wheel 24, are connected to collars 37 carried by the arms 29, 29', Figs. 4 and 5.

The construction and arrangement of the operating mechanism and the working tools or blades as above described, has the following principal advantages:

The bringing close together of the pivoting axis $x, y$, and the axis of the tool-carrying shaft 27, which is made possible by this construction, avoids or greatly reduces the vibration of the system during working, and it has been such vibrations in other constructions which have quickly worn out or destroyed the effectiveness of the mechanism. The arrangement whereby the lifting links 36 are connected directly to collars on the axis of the tool-carrying shaft, also contributes substantially to the reduction of vibrations; and finally, the construction adopted makes it possible the more easily to balance the mechanism effectively.

The modified arrangement, in so far as it concerns the working tools or blades, shown in Figs. 6 and 7, has been devised principally in order to render it easy to replace the tools when they are worn, damaged or broken. In this form of construction, the cross pieces 26, instead of receiving directly the tools 25 as in the first construction shown in Fig. 4, carry tool holders 39 which may be formed for example as is shown in Figs. 6 and 7; these tool holders are slotted to act as grippers at their free ends, the blades 41 forming the tools being inserted in the slots 40 between the jaws, and secured therein by bolts 42 or in any other convenient manner. In order to prevent the tools from slipping in the jaws during working, a number of notches 43 may be formed in the tools, and the bolts engage in one of these notches as shown in Fig. 6, so that the blade 41 is held rigidly in place in the tool holder during working.

In the first form of construction of the implement described above and shown in Figs. 1 to 3, the machine has only one set of blades 25. The invention also includes modified forms of the implement in which there are combined in a novel manner, either two sets of ground-breaking tools of a similar kind, or one set of one kind and another of a different kind, the possible different variations or combinations being those required and adapted for particular classes of work.

In one modification, shown in Fig. 8, the machine comprises two sets of breaking blades which may be placed side by side, but which are preferably placed one a little in advance of the other and a little displaced laterally with respect to one another, so as not to increase unduly the width of the machine. In this form of construction the two sets of blades work at the same depth and the implement covers a wider strip of ground as it works. As Fig. 8 shows, the two sets of breaking tools 23' and 23" are both actuated by gearing arranged as described above, and each of them has an independent lifting and lowering mechanism rendering it possible to work with one or with both sets of blades as required.

As an optional arrangement, it should be noted the machine may be provided with two sets of breaking blades disposed in tandem, the rear set being in principle so arranged as to come into action to a lower depth than the first set. This arrangement would make it possible to work the ground to a greater depth, the second set of blades carrying to a greater depth the work done by the first set. In this arrangement also, each set of blades may have its own driving gear and its own lifting mechanism, so that the implement can be used with one set of blades only if required, or so that the depths to which the two sets of blades are respectively working may be varied at will.

As a further optional arrangement the machine may be combined with a set of breaking blades, another implement or set of tools such as a digger or subsoil plow mounted at the side. Such a machine would be adapted for carrying out certain classes of special agricultural work in which it is necessary to break up the soil down to a certain depth, then to open up the soil in the layer situated immediately beneath this, without this layer of the soil becoming mixed with the layer above. These, and other like combinations of tools in the complete implement, will be apparent without further explanation.

Having thus described my invention what I claim as new and desire to secure by Letters Patent is:—

1. In a motor-driven agricultural implement for working upon the soil, the combination with a vehicle chassis supported by front and rear wheels and a motor carried thereby, of a shaft mounted parallel to the longitudinal axis of the vehicle chassis, a set of blades for operating upon the soil, means for supporting said blades in a revoluble manner on the shaft, a frame supporting said shaft and set of blades, said frame, shaft and blades being so arranged that they are contained within the chassis between the front and rear wheels, means for raising and lowering said frame in the chassis by turning around a center at a little distance from the center of the shaft carrying the blades, and actuating gearing for the shaft carrying the blades, said gearing including a member concentric with the turning axis of the frame.

2. In a motor-driven agricultural implement for working upon the soil, the combination with a vehicle chassis supported by front and rear wheels and a motor carried thereby, of a shaft mounted parallel to the longitudinal axis of the vehicle chassis, a set of blades for operating upon the soil, means for supporting said blades in a revoluble manner on the shaft, a frame supporting said set of blades, said frame, shaft and blades being so arranged that they are contained within the vehicle chassis between the front and rear wheels, means for raising and lowering said frame in the chassis by turning around a center at a little distance from the center of the shaft carrying the blades, said means comprising links connected to collars on the frame coaxial with the shaft carrying the blades, and actuating gearing for the shaft carrying the blades, said gearing having a member concentric with the turning axis of the frame.

3. In a motor-driven agricultural implement for working upon the soil, the combination of a vehicle chassis having two steering wheels adjacent the front end thereof, and a single propelling wheel adjacent the rear end thereof, a motor arranged on the chassis adjacent the front end thereof, a shaft mounted parallel to the longitudinal axis of the chassis, a set of tools carried by said shaft, said tools being adapted to operate upon the soil as the shaft rotates, said shaft and tools being contained within the chassis between the steering wheels and the driving wheel, means for driving the shaft from the motor, means for driving the rear wheel from the motor, and mechanism including a clutch for transmitting the drive either to the rear wheel alone, or to said wheel and also to the shaft carrying the tools, and mechanism for raisng and lowering the shaft carrying the tools with respect to the chassis, said mechanism and the driving mechanism for the shaft carrying the tools being so disposed that the tools can be raised and lowered while they are maintained in operative connection with the motor.

4. In a motor-driven agricultural implement for working upon the soil, the combination with a vehicle chassis and a motor carried thereby, of a frame and means for supporting said frame revolubly in said chassis, a shaft disposed in the turning axis of said frame, means for driving said shaft from the motor, a hollow shaft surrounding an element of the said frame parallel with and at a short distance from the turning axis of the frame, a plurality of supporting members fixed upon said hollow shaft and of blades secured in said supporting members, means for transmitting the drive to said hollow shaft from the shaft in the turning axis of the frame, means for counterbalancing the hollow shaft and the parts carried thereby with respect to the other parts of the frame around its turning axis, links connected to the frame on an axis distant from its turning axis, and means for raising and lowering said links whereby the hollow shaft and the blades carried thereon are raised and lowered with respect to the chassis as may be required.

In testimony whereof I have signed this specification in the presence of two subscribing witnesses.

XAVIER CHARMES.

Witnesses:
 CHAS. P. PRESSLY,
 MIGUEL ZEROLO.